Sept. 9, 1969    M. A. LEVINSTEIN ET AL    3,466,166
METHOD FOR MAKING A HOLLOW METAL ARTICLE
Filed Jan. 3, 1967
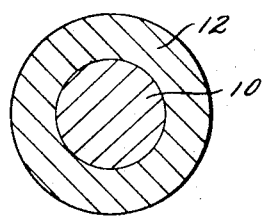
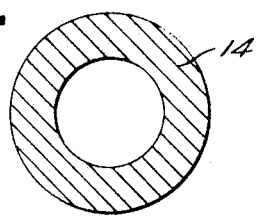
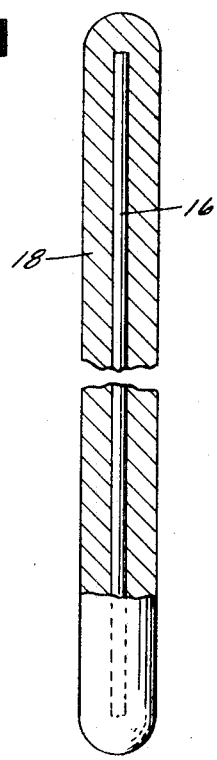
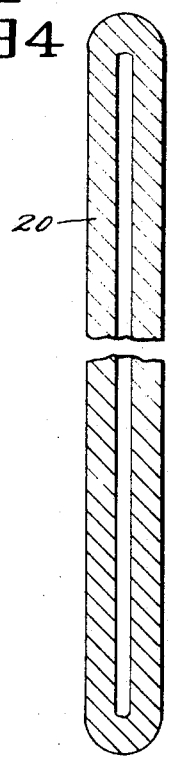
INVENTORS.
MOSES A. LEVINSTEIN
WILLIAM R. BUTTS
BY
*Lee Hachs*
ATTORNEY United States Patent Office 3,466,166
Patented Sept. 9, 1969

3,466,166
METHOD FOR MAKING A HOLLOW METAL ARTICLE
Moses A. Levinstein, Cincinnati, and William R. Butts, Milford, Ohio, assignors to General Electric Company, a corporation of New York
Filed Jan. 3, 1967, Ser. No. 606,963
Int. Cl. C22f 1/00; C22c 1/00, 19/00
U.S. Cl. 75—.5                                6 Claims

ABSTRACT OF THE DISCLOSURE

A hollow metal article is produced by first providing a composite structure corresponding in shape to the hollow article and including a core metallic material coated with a shell metallic material in particular amounts. The core metallic material, upon heating, will preferentially diffuse into the shell metallic material which has a higher melting point, thereby resulting in a hollow central portion within the article.

---

This invention relates to hollow articles including tubes, hollow beads, hollow powders and hollow screen members. More particularly, the invention relates to a method for making hollow metal powders and fine hollow metal wires of a metal alloy including at least one of the elements aluminum and magnesium, and to such an article.

Some of the known methods for making small hollow members such as hollow beads, fine tubes and the like, involve either relatively complex and numerous manufacturing steps or do not result in a uniform product. One such method for preparation of hollow beads is described in U.S. Patent 3,135,044—Mote et al., issued June 2, 1964. That patent describes a method the steps of which include coating a bead such as of aluminum with another metal such as nickel. Then a portion of the bead core material is exposed for the purpose of core removal to provide a hollow interior. The core removal can be accomplished by dissolving with a caustic material or by heating the bead to a temperature sufficient to melt the core and to allow the core to run out through the exposed portion such as a hole. For the manufacture of hollow powders, particularly those smaller than 100 mesh, such known methods are at best impractical to perform.

It is a principal object of the present invention to provide an improved method useful for making very small hollow articles and employing relatively few, simple and easily controlled manufacturing steps.

Another object is to provide an improved method for making hollow metallic powders.

Still another object is to provide a method for making fine hollow wires and tubes as well as screens of such hollow members.

These and other objects and advantages will be more clearly understood from the following detailed description, examples and the drawing all of which are exemplary of rather than limiting on the present invention.

In the drawing:
FIG. 1 is an enlarged diagrammatic cross-sectional view of a composite powder particle prior to processing according to the present invention;
FIG. 2 is an enlarged diagrammatic cross-sectional view of a hollow powder particle resulting from the composite powder particle of FIG. 1 after such processing;
FIG. 3 is an enlarged cross-sectional view of a composite wire prior to such processing; and
FIG. 4 is an enlarged cross-sectional view of the hollow wire resulting from the wire of FIG. 3 after such processing.

The above objects can be attained by providing a core membed in the shape of the desired hollow portion of an article and then coating or enclosing the core member with a shell material having a melting point greater than the material of the core member. A characteristic of the shell material is that upon heating, it will receive by diffusion the core member material, the rate of diffusion of the core material into the shell material being great with respect to diffusion of the shell material into the core material. The core member coated with the shell material is sometimes referred to as a composite structure. Preferably, the core is constructed from a metal or metal alloy selected from the group of aluminum, magnesium, zinc, cadmium and tin and their alloys and the shell is a metal or alloy selected from the group consisting of iron, nickel, cobalt, copper, silver and their alloys.

If shapes, such as screens or meshes are desired, the coated structure, such as wire, can be formed into the shape desired to be attained in the finished member. For example, coated wire can be woven, bent or otherwise shaped. However, it has been found that by shaping the core member such as a wire into a screen or mesh and then coating the screen or mesh with the shell material, a screen or mesh including hollow members can be produced.

The composite structure thus produced is heated at a temperature sufficiently high to bring about diffusion of the core material into the shell material in a reasonable time. However, the temperature is not sufficently high to melt the shell. In this way, a hollow article is formed having the shape of a shell provided pressure is not applied to the article sufficient to cause collapse of the shell.

When the above described core material is in a shape such as a wire, rod, tube or irregular shapes, or in the shape of hollow balls, the problem of applying a metallic coating such as iron, nickel, copper, cobalt, silver and the like, is easily achieved through well known and widely reported electro or vapor deposition processes. The preparation of fine powders coated with a metal, sometimes referred to as composite powders, also is well known and widely reported in the literature. For example, patents and publications include U.S. Patents 2,853,398; 2,853,401 and particularly 2,853,403—Mackiw et al., all issued Sept. 23, 1958; "The Sintering and Alloying Behavior of Nickel Coated Metal Powders" by J. A. Lund, T. Krantz and V. N. Mackiw in Progress of Powder Metallurgy, No. 16, Metal Powder Inlustries Federation, New York, N.Y.; and "The Preparation of Nickel-Coated Powders" by B. Meddings, W. Kunda and V. N. Mackiw, in Power Metallurgy, published by Interscience Publishers, New York, N.Y., in 1961. One form of nickel coated aluminum powders for flames spraying presently are available commercially from Sherritt-Gordon Mines Ltd., Fort Saskatchewan, Alberta, Canada and from Metco Inc., of Westbury, L.I., N.Y. under the name of Metco 404 powder.

Ordinarily these powders were developed and are sold and used for the production of alloys through flame spraying developing relatively high impact forces on the particle or powder metallurgy techniques involving relatively high compressive forces.

It was unexpectedly recognized that when certain composite powders, such as in FIG. 1, as having a core 10 of aluminum and a coating shell 12 of nickel, were heated, in the absence of crushing pressure, to a temperature sufficiently higher than the melting point of aluminum to allow reasonably rapid diffusion of the aluminum into the nickel shell, there resulted reaction producing an expanded, hollow powder particle of FIG. 2 having a continuous shell 14 of an alloy of of nickel and aluminum, presumably nickel aluminide. However, it was recognized that a particular relationship exists between the amount of aluminum in the core and the amount of nickel in the shell. A minimum of about 70 weight percent shell materail, such as nickel, is required because below that amount there is too little nickel resulting in the collapse of the shell. With more than about 95 weight percent nickel, too small a hollow cavity is produced.

In the series of evaluations more particularly described in the examples, it was recognized that if the hollow article to be produced is a substantially spherical powder, the heating rates up to the processing temperature are not particularly critical because of the structural strength of a sphere. For example, such processing temperature is in the range of about 1600–2200° F. in the case of nickel coated aluminum powder. However, when irregular cores or elongated shapes such as wire 16 of FIG. 3 coated with shell 18 are processed, heating of the composite structure up to the processing temperature must be sufficiently slow. This is necessary to control the rate of diffusion so that any expansion of the composite during the reaction and alloying of the elements does not rupture the shell wall. Rupture of the shell results in an imperfect structure which may be unacceptable for certain applications.

The present invention will be more clearly understood from the following detailed examples which are typical of, but not meant to be any limitation on, the scope of the present invention.

Example 1

In this example, the nickel coated aluminum powder previously identified as Metco 404 powder was used. Such material consisted of about 17–20 weight percent aluminum as the core with the balance nickel as the shell. Less than 1 percent impurities were present. The particle size distribution was as follows:

TABLE I

| ASTM sieve size: | Weight percent |
| --- | --- |
| Retained on 140 | 1 max. |
| Retained on 170 | 10 max. |
| Retained on 270 | 85 min. |
| Through 270 | 15 max. |

Photomicrographic observation of the above described unprocessed composite powder shown diagrammatically in FIG. 1 indicated a substantially spherical solid core 10 covered with a relatively uniform shell 12. This powder was heated in air at 1950° F. for two hours after which it was again observed metallographically. It was seen that the solid aluminum core had diffused into the shell forming a slightly expanded hollow powder particle shown in FIG. 2. The same heat treatment at 1950° F. for two hours was repeated on additional specimens in hydrogen with the same results.

The procedure of Example 1 was repeated for a series of composite powders having an aluminum core and nickel shell in the amounts shown in the following Table II. The powders were heated for one hour at about 2000° F. in hydrogen.

TABLE II.—COMPOSITE POWDER WT. PERCENT

| Example | Ni | Al | Shell condition |
| --- | --- | --- | --- |
| 2 | 90 | 10 | Sound. |
| 3 | 75 | 25 | Do. |
| 4 | 67 | 33 | Collapsed. |

From the above Table II, it can be seen that such composite powders including a shell comprising less than about 70 weight percent of the total powder particle results in an imperfect hollow article.

In order to evaluate the present invention with core members of shapes other than spherical powders, a series of aluminum wires such as shown at 16 in FIG. 3 were electroplated with a nickel coating 18. Representative of the wires tested are those shown in the following Table III.

TABLE III.—COMPOSITE WIRES

| Example | Al wire diameter (mils) | Ni coating thickness (mils) |
| --- | --- | --- |
| 5 | 15 | 5 |
| 6 | 25 | 7.5 |
| 7 | 40 | 10 |

On a weight percent basis, the aluminum consisted essentially of 20–27%, with the balance nickel. As was mentioned before, it was found that structures such as wires do not have the structural strength of a sphere. Thus heating of such structures should be conducted more slowly to prevent any expansion due to the diffusion of the core into the shell from rupturing the shell. Therefore, the wires of Examples 5, 6 and 7 were heated in argon by first heating from room temperature to about 1200° F. over a period of 1 hour and then heating to 1950–2000° F. over a period of one hour. The wires were then held in argon for ½ hour at about 2000° F. after which they were cooled to room temperature over a period of about an hour. Further photomicrographic examination of the product of this diffusion revealed sound, hollow wires as shown in FIG. 4 presumably of an alloy 20 of aluminum and nickel.

Example 8

Typical of the use of the method of the present invention in making a hollow article is the production of a wire mesh including hollow woven wires. In one example, a 120 x 120 mesh made of 99% pure aluminum 4 mil wire was obtained in a twill weave.

Specimens 3 inches long by 2 inches wide were cut and then electroplated with nickel to a thickness of about 1.5 mils using standard commercial nickel electroplating procedures. During electroplating, clips which were used to hold the mesh specimens were moved from time to time so that the entire specimen would be coated with nickel. After coating with nickel, the specimens were placed in a hydrogen atmosphere furnace in which the temperature was increased from room temperature to about 2000° F. over a period of between 1–1.5 hours. Then the specimens were held in hydrogen at 2000° F. for about ½ hour before being cooled in hydrogen and removed from the furnace.

Photomicrographic examination of the mesh showed that the original aluminum wire mesh had diffused into the nickel coating resulting in a mesh of hollow wires of an alloy of nickel and aluminum. Because hollow articles of this invention are slightly expanded during processing, it was found that the overall diameter of the wire had increased to 7–8 mils with the inside diameter of the hollow wire being in the range of 3–4 mils. Thus with the production of hollow wires and hollow meshes or screens, it can be readily seen that the present invention can be used to provide from simple to complex hollow shaped articles.

Although this invention has been described in connection with some specific examples, both as to the materials involved and the shapes employed, it will be understood by those skilled in the art the variations and modifications of which the invention is capable particularly in view of vast amount of material reported in the fields and coatings and intricate metal formation. It is intended in the appended claims to cover all such variations and modifications.

What is claimed is:

1. A method for making a hollow metal article having a substantially nonporous metal shell, comprising the steps of:

providing a composite structure corresponding in shape to the hollow article, the composite structure consisting essentially of about 5–30 weight percent of a first metallic material selected from the group consisting of Al, Mg, Zn, Cd, Sn and their alloys coated with a substantially nonporous shell of about 70–95 weight percent of a second metallic material selected from the group consisting of Fe, Ni, Co, Cu, Ag and their alloys;

the diffusion rate of the first material into the second material being greater than the diffusion rate of the second material into the first material so that the material of the core will diffuse preferentially into the material of the shell;

the second material having a melting point greater than the first material; and then producing the hollow article by heating the composite structure at a temperature above the melting point of the first material but below the melting point of the second material for a time sufficient to diffuse the first material molecularly into the second material in the absence of pressure sufficient to bring about collapse of the hollow article.

2. The method of claim 1 in which the composite structure is heated at a temperature in the range of 1600–2200° F. to diffuse the first material into the second material.

3. The method of claim 2 in which the first material is aluminum and the second material is nickel.

4. The method of claim 1 for preparing a hollow powder in which the composite structure is a substantially spherical powder.

5. The method of claim 1 for preparing hollow wire in which the composite structure comprises the core of a first material in the shape of a wire coated with a shell of the second material.

6. The method of claim 1 for making a wire mesh including hollow wires, in which the structure provided is a wire mesh at least partially including, in the mesh, wires having a core of the first material coated with a shell of the second material.

References Cited

UNITED STATES PATENTS

| 2,223,862 | 12/1940 | Widell. | |
| 2,273,589 | 2/1942 | Olt. | |
| 2,401,483 | 6/1946 | Hensel et al. | 29—191.2 X |
| 2,409,295 | 10/1946 | Marvin et al. | 29—191.2 X |
| 2,628,166 | 2/1953 | Holler | 117—99 X |
| 2,706,693 | 4/1955 | Holler | 117—99 X |
| 2,884,688 | 5/1959 | Herz. | |
| 2,910,356 | 10/1959 | Grala et al. | |
| 3,113,376 | 12/1963 | Pflumm et al. | |
| 3,151,037 | 9/1964 | Johnson et al. | |

FOREIGN PATENTS 1,011,348   11/1965   Great Britain.

L. DEWAYNE RUTLEDGE, Primary Examiner

G. K. WHITE, Assistant Examiner.

U.S. Cl. X.R.

29—183, 192, 194; 75—123, 129, 135, 153, 170, 173